March 7, 1944.   J. E. OVERBECK ET AL   2,343,792
APPARATUS FOR MEASURING PULSATING FLUIDS
Filed June 11, 1941    2 Sheets-Sheet 1
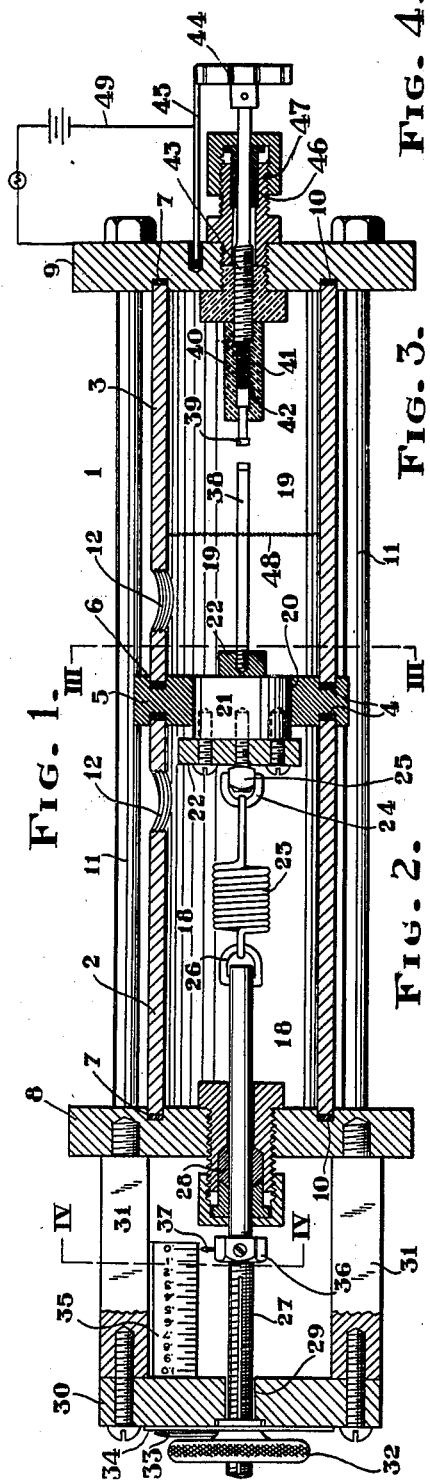
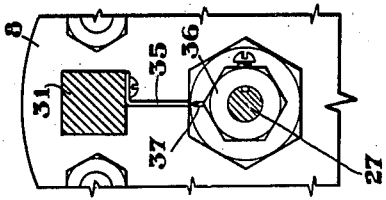
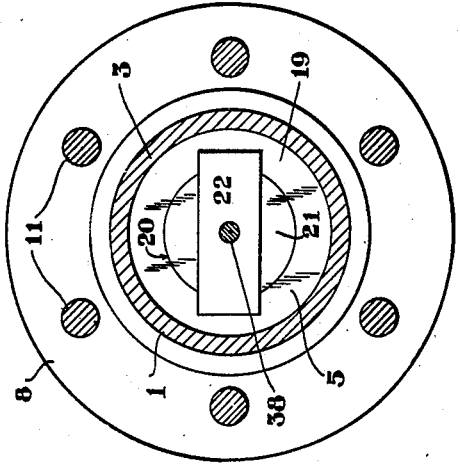
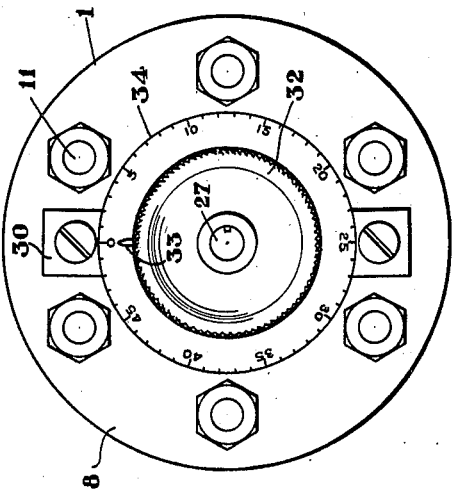
Inventor
John E. Overbeck
Samuel R. Beitler
By  W. S. M'Lowell
    Attorney

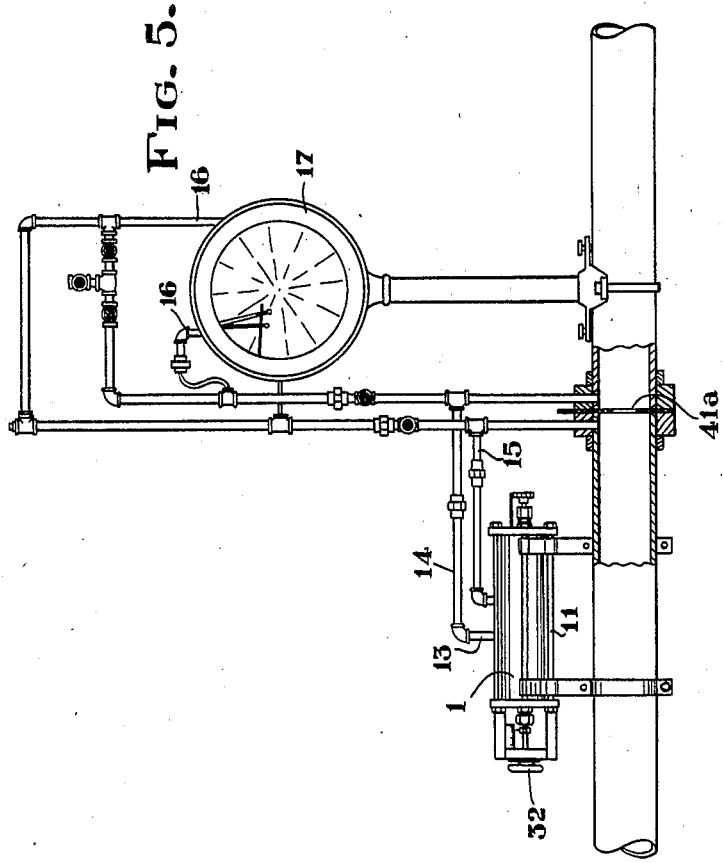

Patented Mar. 7, 1944

2,343,792

UNITED STATES PATENT OFFICE 2,343,792

APPARATUS FOR MEASURING PULSATING FLUIDS

John E. Overbeck and Samuel R. Beitler, Columbus, Ohio

Application June 11, 1941, Serial No. 397,590

4 Claims. (Cl. 73—111)

This invention relates to an improved apparatus for measuring the rapidly varying pressures of the type which exists when pulsating fluid flow in confined pipe systems is present.

Such pulsating fluid flow presents conditions which affect the accuracy of inferential or orifice type meters and it is one of the purposes of the present invention to provide an improved means for indicating the amount of these pressure variations or pulsations.

The inferential type meter used commercially consists of a "primary device" (orifice plate, nozzle, Venturi tube, Pitot tube etc.) and a "secondary device" in the form of suitable pressure measuring apparatus. The primary device possesses a difference in pressure which is proportional to the square of the velocity of the fluid flowing in a confining conduit, and the secondary device measures this difference in pressure. It has been recognized that accurate measurements cannot be made when the flow through the meter is of a pulsating character. These pulsations usually occur in pipe lines which are connected to reciprocating compressors, steam engines, pumps, or may result from worn fittings, valves, from slugs of different flowing fluids, and from other causes. It has been realized that accurate measurements can not be made when appreciable pulsation is present. So far as known, no method or device has been developed for determining under what conditions the pulsations are appreciable to the extent that the same affect the accuracy of the measurement. This may be attributable to the fact that error has been assumed to be due to the pulsation on one side of the primary device of the inferential meter.

This invention has for an object, among others, to provide a novel means for determining, in a confined pipe line system having associated therewith an inferential meter, when pulsating fluid flows are present, the extent of pulsation and its effect on any particular meter.

Many devices have been used for measuring the intensity of the pressure variation at one place in the pipe line or meter. Considerable research has shown that the extent of error produced by pulsation on a meter is not directly dependent upon the pulsation in any one place, but rather dependent upon the variations in pressure at or contiguous to the two pressure connections required for inferential type meters.

The present invention further consists in the provision of apparatus for measuring differences in pressure pulsations between the two pressure connections, which differences are the main factors affecting the accuracy of an inferential type meter. The variation in pressure pulsations between the two pressure connections are different for different primary devices, for different installations, and for varying rates of flow on the same installation. The present invention provides for determining the difference in amplitude, frequency, or both, between the two connections in terms of certain pressure units. The magnitude of this difference determines the conditions at which measurements may be made with commercial accuracy.

For a further understanding of the invention, reference is to be had to the following description and the accompanying drawings, wherein:

Fig. 1 is a vertical sectional view taken through a fluid pressure indicator formed in accordance with the present invention;

Fig. 2 is an end elevational view of the indicator;

Fig. 3 is a vertical transverse sectional view taken through the indicator on the line III—III of Fig. 1;

Fig. 4 is a similar view on the line IV—IV of Fig. 1.

Fig. 5 is a diagrammatic view showing the application of the indicator to a pipe system.

In the accompanying drawings, there has been illustrated mechanical apparatus suitable for use in carrying out the purposes of the present invention. This apparatus, in the form shown in Fig. 1, comprises a pressure-tight, fluid-receiving casing 1. This casing may be composed of a pair of cylindrical members shown at 2 and 3, which are arranged in longitudinal alignment. The adjacent ends of these members are received within annular grooves 4, provided in the opposite faces of a circular separating plate 5. Preferably, the grooves 4 are equipped with annular gaskets 6, against which the ends of the members 2 and 3 press. At the opposite ends, the members 2 and 3 are received within annular grooves 7, provided in the inner faces of a pair of circular heads indicated at 8 and 9. Annular gaskets 10 are preferably seated in the grooves 7 for yieldable engagement with the ends of the members 2 and 3. Longitudinally extending tie rods 11 unite the heads 8 and 9, and when the nuts carried by the threaded ends of the rods 11 are tightened, compressive forces are applied to the cylindrical members 2 and 3 to maintain them in operative order in relation to the plate 5 and the heads 8 and 9.

The members 2 and 3 are each formed with a threaded opening 12, these openings receiving threaded fittings 13 connected with tubes 14 and 15, said tubes extending to the two pressure tap connections 16 of an inferential meter 17. The latter is of standard construction and need not be further described, a typical example being the Foxboro meter.

The plate 5 separates the casing into fluid receiving chambers 18 and 19, the latter receiving fluids, such as a gas, from the pressure connections of the meter 17. Provided in the plate 5 is a circular bore 20, in which is slidably received a close-fitting piston 21. This piston is free to move for a short distance in the bore 20, but is restrained from complete removal therefrom by means of transversely extending bars 22, fixed to the opposite end walls of the piston. These bars are of sufficient length so that they project beyond the sides of the piston body and may therefore contact with the side walls of the plate 5 to limit the movement of the piston. It will be seen that any difference in pressure between the two pressure connections of the meter 17 (which difference simultaneously obtains in the chambers 18 and 19) will cause the piston 21 to move toward the lower pressure side, namely, toward the chamber 19. This movement of the piston is resisted by means of a coil spring shown at 23. One end of this spring is connected with a bail 24 carried by a head screw 25, the latter being threaded into one end of the piston 21. The opposite end of the spring 23 is connected with a bail 26, which is pivotally movable on the unthreaded end of an indexing screw 27.

The unthreaded portion of this screw is slidably supported in a packed bearing 28 carried axially by the head 8, while the outer threaded end of the screw 27 is loosely received within an opening 29 provided in an extension head 30, the latter being supported by means of bars 31 from the head 8. Beyond the extension head 30, the threaded end of the screw 27 is equipped with a hand wheel 32, which when rotated, will cause longitudinal sliding movement of the screw 27, thereby governing the tension of the spring 23 and varying the forces exerted by the latter on the piston 21 to meet different fluid pressure conditions. The wheel 32 is provided with an indexing finger 33 which is movable relative to a circular scale 34 fixed on the outer face of the head 30. Also, projecting from the inner face of the head 30 is a linear scale 35, and fixed to the screw 27 is a nut 36 carrying an indexing finger 37, which is movable relative to the calibrations appearing on the scale 35.

It will be seen that the tension on the spring 23 can be varied by turning the hand wheel 32, which moves the screw or rod 27 and varies the length of the coil spring 23. The amount of tension in the spring will be indicated by the total displacement of the finger or pointer 37 in relation to the scale 35, which, by calibration, can be made to read in pressure units for a given size of piston 21. If there is a variation in pressure between the meter pressure connections, the piston 21 will tend to move because of such variations, and this movement is utilized to determine whether the readings of the inferential meter are in error as the result of pulsation.

Arranged in the chamber 19 and rigidly extending from one side of the piston 21 is a sliding contact rod 38, and normally spaced from this rod is a complemental, longitudinally aligned contact member 39. This member is mounted in an insulated fitting 40, carried axially by the head 9. The fitting 40 includes a bore 41, in which the member 39 is slidably received. A spring 42 is positioned in the bore 41 and has yielding engagement with the member 39. The bore 41 is closed in a gas-tight manner and a seat provided for the spring 42 through the inclusion of a stem 43. The threaded end of this stem is received within a threaded opening provided in the fitting 40, and the outer end of the stem is equipped wtih a hand wheel 44, so that it may be rotated. The peripheral portion of the wheel 44 is notched at intervals to receive the free end of a lock spring 45, which projects from the head 9, and normally holds the hand wheel 44 against rotation. In addition, the stem 43 is received within a packed bearing 46, formed in connection with a sleeve 47, also carried by the head 9. A fire protecting wire screen 48 of fine mesh may be arranged in the chamber 19, about the movable electrode or contact rod 38. When the contacts 38 and 39 are in relative engagement, an electric circuit 49 is completed. This circuit may include an incandescent lamp, or other visual or audible electrically energized signal mounted on the outside of the apparatus. If the gap between the contact members 38 and 39 is made very small, then any slight movement of the piston 21 may be readily detected.

The maximum pressure difference between the prssure connections will be shown when the tension of the spring is just enough to prevent movement of the piston. The pressure difference resulting from pulsation of gas flowing in a confined pipe line is then determined by subtracting algebraically the differential pressure shown by the secondary device of the meter, from the pressure difference indicated by the reading of the pointer 37 on the scale 35.

In operation, the casing is mounted so that the tubes 14 and 15 are joined with the two pressure tap connections of the meter 17, the latter being of the orifice or inferential type employed in the measurement of fluid passage through confining pipes. When the pressures on the two sides of the piston are as nearly as possible the same as those existing in the meter connections, then the hand wheel 32 is turned until the motion indicator in the circuit 49 shows no motion of the piston. The position of the finger 37 with respect to the scale 35 should then be determined and the differential pressure as indicated by the meter secondary device should be read simultaneously. The difference between these two values, expressed in proper pressure units, will then give the amplitude of the pulsating pressure, and the latter can be made to indicate whether or not the meter reading of flow is the correct value for that particular installation.

It will be obvious to anyone skilled in the art that various modifications of this invention may be practiced without departing from the spirit and scope thereof. It is, therefore, understood that the scope of this invention is not to be limited by the accompanying example but only by way of the scope of the appended claims.

What is claimed is:

1. Apparatus for determining pulsating fluid flow in conduit systems, comprising a cylinder, a piston slidably mounted in said cylinder, said piston being spaced from the end walls of the cylinder to produce on the opposite sides thereof high and low pressure fluid chambers, a piston rod slidably projecting through the high pressure end of the cylinder, spring means uniting the inner end of said piston rod with said piston, threaded means cooperative with the outer end of said rod for varying the tension of said spring means to control the resistance of said piston to movement in response to unbalanced fluid pressures on opposite sides thereof, and indicating means cooperative with said piston rod externally of said cylinder to provide a visual indication of the extent of adjustment of said threaded means in resisting movement of said piston.

2. Apparatus for determining pulsating fluid flow in conduit systems, comprising a cylinder, a piston slidably mounted in said cylinder, said piston being spaced from the end walls of the cylinder to produce on the opposite sides thereof high and low pressure fluid chambers, a piston rod slidably projecting through the high pressure end of the cylinder, spring means uniting the inner end of said piston rod with said piston, threaded means cooperative with the outer end of said rod for varying the tension of said spring means to control the resistance of said piston to movement in response to unbalanced fluid pressures on opposite sides thereof, indicating means cooperative with said piston rod externally of said cylinder to provide a visual indication of the extent of adjustment of the threaded means to resist movement of said piston, an electrically operated signal and a circuit for said signal adapted to be opened and closed by the movement of said piston.

3. Apparatus for determining pulsating fluid flow in conduit systems, comprising a cylinder structure, a divisional wall disposed substantially centrally of said cylinder structure, said wall having a bore formed therein, a piston member slidably mounted in said bore for limited reciprocatory movement in response to unbalanced fluid pressures developed in said cylinder structure on opposite sides of the piston, a rod slidably carried by one end of said cylinder structure, a coil spring uniting the inner end of said rod with one side of said piston, adjustable threaded means cooperative with the outer end of said rod for moving the latter longitudinally and adjusting the tension of said spring, whereby to control the response of said piston to unbalanced fluid pressures on opposite sides thereof, a lineally movable indicator cooperative with the externally projecting portions of said rod for denoting exteriorly of the cylinder structure the extent of adjustment of said threaded means when moved to resist reciprocatory movement of said piston, and means for introducing fluids into said cylinder structure on opposite sides of said piston.

4. Apparatus for determining pulsating fluid flow in conduit systems, comprising a cylinder structure, a divisional wall disposed substantially centrally of said cylinder structure, said wall having a bore formed therein, a piston slidably mounted in said bore for limited reciprocatory movement in response to unbalanced fluid pressures developed in said cylinder structure on opposite sides of the piston, a rod slidably carried by one end of said cylinder structure, a coil spring uniting the inner end of said rod with one side of said piston, adjustable threaded means cooperative with the outer end of said rod for moving the latter longitudinally and adjusting the tension of said spring, whereby to vary the response of said piston to unbalanced fluid pressures on opposite sides thereof, a lineally movable indicator cooperative with the externally projecting portions of said rod for denoting exteriorly of the cylinder structure the extent of adjustment of said threaded means when actuated to cause said spring to resist reciprocatory movement of said piston, means for introducing fluids into said cylinder structure on opposite sides of said piston, a contact member movable in unison with said piston, a second contact member adjustably carried by the other end of said cylinder structure, an electrical circuit of which said contacts form a part, and a signalling instrumentality in said circuit and adapted to be energized when said contacts are in relative engagement.

JOHN E. OVERBECK.
SAMUEL R. BEITLER.